United States Patent
Lee et al.

(10) Patent No.: US 10,787,094 B2
(45) Date of Patent: Sep. 29, 2020

(54) VEHICLE BATTERY REMOTE MANAGEMENT SYSTEM AND METHOD

(71) Applicant: LG Chem, Ltd., Seoul (KR)

(72) Inventors: Hujun Lee, Daejeon (KR); Sang Hoon Lee, Daejeon (KR); Chang Hyun Sung, Daejeon (KR)

(73) Assignee: LG Chem, Ltd. (KR)

( * ) Notice: Subject to any disclaimer, the term of this patent is extended or adjusted under 35 U.S.C. 154(b) by 32 days.

(21) Appl. No.: 16/328,367

(22) PCT Filed: Feb. 21, 2018

(86) PCT No.: PCT/KR2018/002122
§ 371 (c)(1),
(2) Date: Feb. 26, 2019

(87) PCT Pub. No.: WO2018/221839
PCT Pub. Date: Dec. 6, 2018

(65) Prior Publication Data
US 2020/0122599 A1    Apr. 23, 2020

(30) Foreign Application Priority Data
May 31, 2017    (KR) .................. 10-2017-0067699

(51) Int. Cl.
*G08B 21/00*    (2006.01)
*B60L 58/10*    (2019.01)
(Continued)

(52) U.S. Cl.
CPC .......... *B60L 58/10* (2019.02); *G06K 7/10297* (2013.01); *G06K 19/0723* (2013.01);
(Continued)

(58) Field of Classification Search
CPC ............... B60L 58/10; G06K 7/10297; G06K 19/0723; G07C 5/08; H04Q 9/00; H04Q 2209/10
See application file for complete search history.

(56) References Cited

U.S. PATENT DOCUMENTS

| | | | | |
|---|---|---|---|---|
| 5,521,443 A | * | 5/1996 | Imura | ..................... B60L 1/003 307/10.2 |
| 5,596,261 A | * | 1/1997 | Suyama | .................. B60L 58/12 320/152 |

(Continued)

FOREIGN PATENT DOCUMENTS

| | | |
|---|---|---|
| JP | 2007-230398 A | 9/2007 |
| JP | 2011-162052 A | 8/2011 |

(Continued)

OTHER PUBLICATIONS

International Search Report in PCT/KR2018/002122, dated Jun. 11, 2018, 2 pages.

*Primary Examiner* — Quang Pham
(74) *Attorney, Agent, or Firm* — Lerner, David, Littenberg, Krumholz & Mentlik, LLP

(57) ABSTRACT

The present invention relates to a system and a method of remotely managing a battery for a vehicle, in which electromagnetic waves emitted from a vehicle adjacent to a vehicle for management are rectified and are usable as operation power for monitoring a state of the battery of the vehicle for management, and a passive radio frequency identification (RFID) reader module installed in the vehicle adjacent to the vehicle for management obtains the state of the battery of the vehicle for management and then provides a terminal of an owner of the vehicle for management with the obtained state of the battery, thereby enabling the owner of the vehicle for management located at a remote place to (Continued)

recognize a charging/discharging state of the battery of his/her vehicle and the like in real time.

10 Claims, 4 Drawing Sheets

(51) Int. Cl.
    *G06K 7/10*            (2006.01)
    *G06K 19/07*         (2006.01)
    *G07C 5/08*            (2006.01)
    *H04Q 9/00*          (2006.01)

(52) U.S. Cl.
    CPC ................. *G07C 5/08* (2013.01); *H04Q 9/00*
                        (2013.01); *H04Q 2209/10* (2013.01)

(56) References Cited

U.S. PATENT DOCUMENTS

| | | | | |
|---|---|---|---|---|
| 5,739,674 | A * | 4/1998 | Kawahara | G01R 31/3648 320/106 |
| 8,463,953 | B2 * | 6/2013 | Davis | G06F 13/10 710/16 |
| 8,829,910 | B2 * | 9/2014 | Nishidai | H02J 7/027 324/427 |
| 8,868,235 | B2 * | 10/2014 | Zhao | B60S 5/06 700/245 |
| 8,984,208 | B2 * | 3/2015 | Lee | G06F 3/0659 711/103 |
| 9,134,136 | B2 * | 9/2015 | Yamada | B60L 15/2045 |
| 9,815,375 | B2 * | 11/2017 | Matsuda | B60L 53/305 |
| 9,895,992 | B2 | 2/2018 | Seo et al. | |
| 10,106,048 | B2 * | 10/2018 | Haddad | B60L 53/665 |
| 10,518,640 | B2 * | 12/2019 | Wada | B60L 58/10 |
| 10,604,066 | B2 * | 3/2020 | Brusco | B60L 58/13 |
| 2008/0231449 | A1 * | 9/2008 | Moshfeghi | G08C 17/02 340/572.1 |
| 2009/0237252 | A1 * | 9/2009 | Inano | G06K 19/0707 340/572.1 |
| 2010/0230193 | A1 * | 9/2010 | Grider | B60L 3/12 180/65.27 |
| 2011/0082621 | A1 * | 4/2011 | Berkobin | B60L 53/30 701/31.4 |
| 2012/0059533 | A1 | 3/2012 | Oh et al. | |
| 2012/0280836 | A1 * | 11/2012 | Roesner | G08G 1/0175 340/932.2 |
| 2013/0278402 | A1 * | 10/2013 | Rothschild | B60Q 1/50 340/425.5 |
| 2014/0214242 | A1 * | 7/2014 | Seo | B60L 1/02 701/2 |
| 2016/0137091 | A1 * | 5/2016 | Yamazoe | H02J 7/00 320/136 |

FOREIGN PATENT DOCUMENTS

| | | |
|---|---|---|
| JP | 2013-130963 A | 7/2013 |
| JP | 6111756 B2 | 4/2017 |
| KR | 2011-0038965 A | 4/2011 |
| KR | 20120024080 A | 3/2012 |
| KR | 2012-0121156 A | 11/2012 |
| KR | 2013-0087779 A | 8/2013 |
| KR | 2014-0097806 A | 8/2014 |
| KR | 2016-0037651 A | 4/2016 |
| KR | 2017-0036279 A | 4/2017 |

* cited by examiner

DISCHARGE

VEHICLE FOR MANAGEMENT IN STARTING-OFF STATE

VEHICLE BATTERY REMOTE MANAGEMENT SYSTEM AND METHOD

CROSS REFERENCE TO RELATED APPLICATIONS

The present application is a national phase entry under 35 U.S.C. § 371 of International Application No. PCT/KR2018/002122 filed Feb. 21, 2018, published in Korean, which claims priority from Korean Patent Application No. 10-2017-0067699 filed in the Korean Intellectual Property Office on May 31, 2017, all of which are incorporated herein by reference.

TECHNICAL FIELD

The present invention relates to a system and a method of remotely managing a battery for a vehicle, and more particularly, to a system and a method of remotely managing a battery for a vehicle, in which electromagnetic waves emitted from a passive radio frequency identification (RFID) reader module installed in a vehicle adjacent to a vehicle for management, not power of a battery of the vehicle for management, are rectified and are usable as operation power for monitoring a state of the battery of the vehicle for management, and the passive RFID reader module installed in the vehicle adjacent to the vehicle for management obtains the state of the battery of the vehicle for management and then provides a terminal of an owner of the vehicle for management with the obtained state of the battery by using wired/wireless network communication, thereby enabling the owner of the vehicle for management located at a remote place to recognize a charging/discharging state of the battery of his/her vehicle and the like in real time.

BACKGROUND ART

Recently, in order to decrease use of an internal combustion engine and use eco-friendly electric energy, vehicles mounted with large-capacity batteries have been released.

In the meantime, since various electronic functions performed in a vehicle are operated based on power of a battery, when several electronic functions are operated in a situation where the vehicle fails to start, there is concern that the battery is discharged, and in addition, there is concern that the battery is discharged due to various external environmental reasons, for example, the case where a vehicle is not started for a long time, so that a life of the battery is decreased and the battery is not properly charged.

Further, recently, a black box is widely supplied, so that it is difficult to find a vehicle in which a black box is not installed, and the black box is connected with a battery of a vehicle through regular power, so that power of the battery is continuously consumed in a situation where the vehicle is not started, thereby having concern that the battery is discharged.

Some of the black boxes have a function of monitoring a voltage of a battery of a vehicle, and then blocking power of the black box when the monitored voltage is equal to or smaller than a predetermined battery voltage, but the function is a prevention means for suspending power consumption of the black box, but cannot prevent the battery from being discharged due to the other electronic functions.

Particularly, when a battery is completely discharged, there is no minimum power left for driving a start motor of a vehicle, so that the vehicle fails to be started, and in this case, a user located at a remote place cannot know whether the battery of the vehicle is currently in a discharging state or not, so that there is a problem in that only after the user identifies the failure of the start of his/her vehicle, the user can recognize the discharging of the battery.

In this respect, in order to solve the problems generated in a battery of a vehicle in the related art, the present inventors developed a system and a method of remotely managing a battery for a vehicle, in which electromagnetic waves emitted from a passive radio frequency identification (RFID) reader module installed in a vehicle adjacent to a vehicle for management, not power of a battery of the vehicle for management, are rectified and are usable as operation power for monitoring a state of the battery of the vehicle for management, and the passive RFID reader module installed in the vehicle adjacent to the vehicle for management obtains the state of the battery of the vehicle for management and then provides a terminal of an owner of the vehicle for management with the obtained state of the battery by using wired/wireless network communication, thereby enabling the owner of the vehicle for management located at a remote place to recognize a charging/discharging state of the battery of his/her vehicle and the like in real time.

DETAILED DESCRIPTION OF THE INVENTION

Technical Problem

The present invention is conceived to solve the foregoing problems, and an object of the present invention is to provide a system and a method of remotely managing a battery for a vehicle, in which electromagnetic waves emitted from a passive radio frequency identification (RFID) reader module installed in a vehicle adjacent to a vehicle for management, not power of a battery of a vehicle for management, are rectified and are usable as operation power for monitoring a state of the battery of the vehicle for management, and the passive RFID reader module installed in the vehicle adjacent to the vehicle for management obtains the state of the battery of the vehicle for management and provides a terminal of an owner of the vehicle for management with the obtained state of the battery by using wired/wireless network communication, thereby enabling the owner of the vehicle for management located at a remote place to recognize a charging/discharging state of the battery of his/her vehicle and the like in real time.

Technical Solution

An exemplary embodiment of the present invention provides a system for remotely managing a battery for a vehicle, the system including: a battery state data collecting unit which is provided in a first vehicle corresponding to a power off state, and collects battery state data of the first vehicle; and a battery state data obtaining unit which is provided in a second vehicle, wherein the battery state data obtaining unit is configured to when the second vehicle is in a power on state and positioned adjacent to the first vehicle, transmit electromagnetic waves to the battery state data collecting unit by using power of a battery of the second vehicle to turn on the battery state data collecting unit, and obtain the battery state data from the battery state data collecting unit.

In the exemplary embodiment, the battery state data obtaining unit may provide the battery state data to an external server so that the obtained battery state data is capable of being provided through the external server to a user terminal for management through the external server.

In the exemplary embodiment, the battery state data collecting unit may include a passive radio frequency identification (RFID) tag module, and the battery state data obtaining unit may include a passive RFID reader module.

In the exemplary embodiment, the battery state data collecting unit may rectify electromagnetic waves emitted from the passive RFID reader module to initiate an on-operation.

In the exemplary embodiment, the passive RFID tag module may be electrically connected with an auxiliary battery of the first vehicle.

In the exemplary embodiment, the battery state data obtaining unit may further include a communication unit which is configured to provide the battery state data obtained through the passive RFID reader module to the external server by using wired/wireless network communication.

Another exemplary embodiment of the present invention provides a method of remotely managing a battery for a vehicle, the method including: collecting, by a battery state data collecting unit provided in a first vehicle corresponding to a power off state, battery state data of the first vehicle; transmitting, by a battery state data obtaining unit provided in a second vehicle that is in a power on state and that is positioned adjacent to the first vehicle, electromagnetic waves to the battery state data collecting unit by using power of a battery of the second vehicle to turn on the battery state data collecting unit, and obtaining the battery state data from the battery state data collecting unit; and providing, by the battery state data obtaining unit, the obtained battery state data to an external server.

Advantageous Effects

According to one aspect of the present invention, electromagnetic waves emitted from a passive radio frequency identification (RFID) reader module installed in a vehicle adjacent to a vehicle for management, not power of a battery of the vehicle for management, are rectified and used as operation power for monitoring a state of the battery of the vehicle for management, so that there is an advantage in that power of the battery of the vehicle for management is not consumed when the state of the battery of the vehicle for management is measured.

According to another aspect of the present invention, a passive RFID reader module installed in a vehicle adjacent to a vehicle for management obtains a state of a battery of the vehicle for management and then provides a terminal of an owner of the vehicle for management with the obtained state of the battery by using wired/wireless network communication, so that there is an advantage in that an owner of the vehicle for management located at a remote place may recognize a charging/discharging state of the battery of his/her vehicle and the like in real time.

BEST MODE

Hereinafter, an exemplary embodiment is presented for helping understanding of the present invention. However, the exemplary embodiment below is simply provided for more easy understanding of the present invention, and the contents of the present invention are not limited by the exemplary embodiment.

Figure 1:
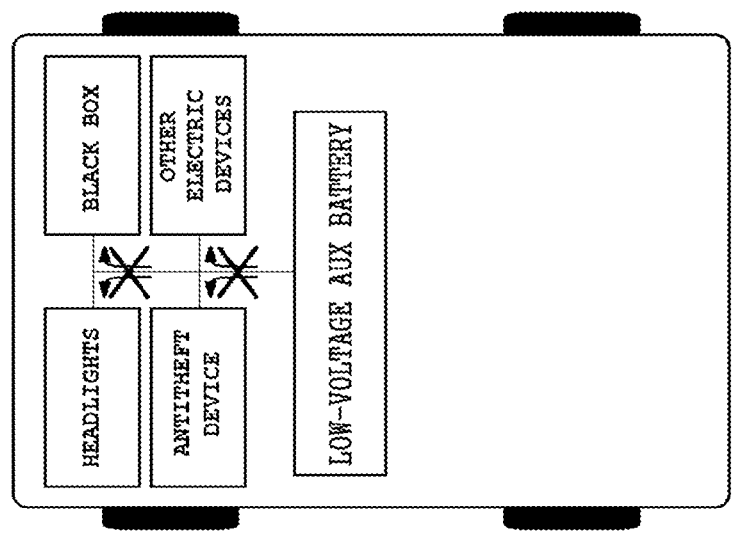
FIG. 1 is a diagram illustrating a battery discharging state generated according to a connection between a low-voltage auxiliary battery 2 and various electric devices provided in a vehicle 1 for management in the related art.
Figure 1:
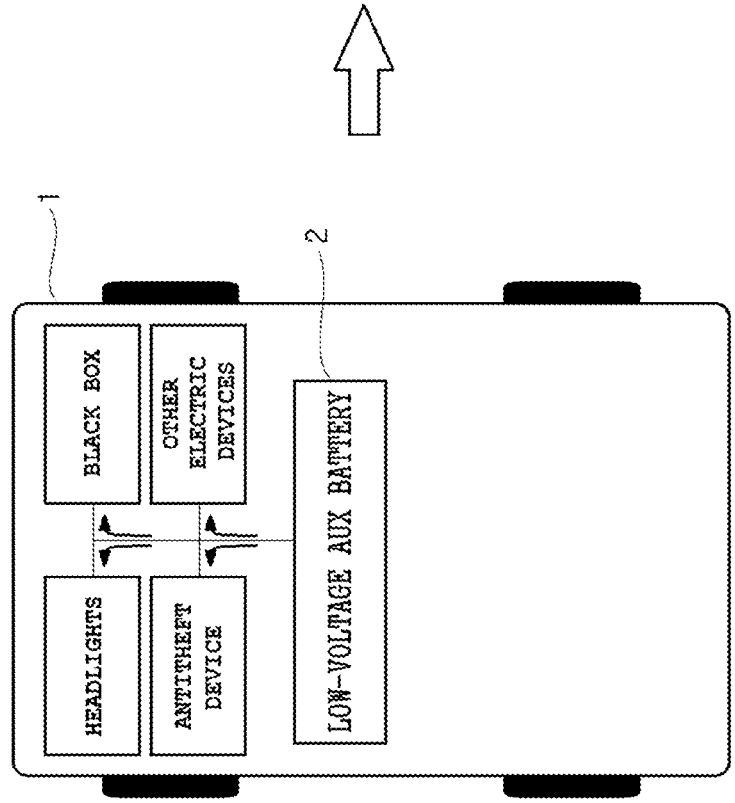

FIG. 1 is a diagram illustrating a battery discharging state generated according to a connection between a low-voltage auxiliary battery 2 and various electric devices provided in a vehicle 1 for management in the related art.

Referring to FIG. 1, various electronic devices, such as headlights, an emergency light, a dome light, a black box, and an antitheft device, may be connected to the low-voltage auxiliary battery 2 provided in the vehicle 1 for management through regular power.

In this case, there are problems in that a performance and a life of the low-voltage auxiliary battery 2 may be degraded due to a temperature difference in a high-temperature or low-temperature environment, and when the battery is discharged due to carelessness of a user, such as the case where a user does not turn off the headlights of the vehicle, the case where a user does not set a low voltage of a black box to be an off state, or the case where a user does not turn off a regular LED function of an antitheft device, after an operation of the vehicle is terminated, there is no particular method of enabling a user to check the discharging of the battery at a remote place, in the related art.

Accordingly, the present inventors will concretely describe a system 100 for remotely managing a battery for a vehicle, which is capable of solving the problems in the related art, with reference to FIGS. 2 to 4 to be described below.

Figure 2:
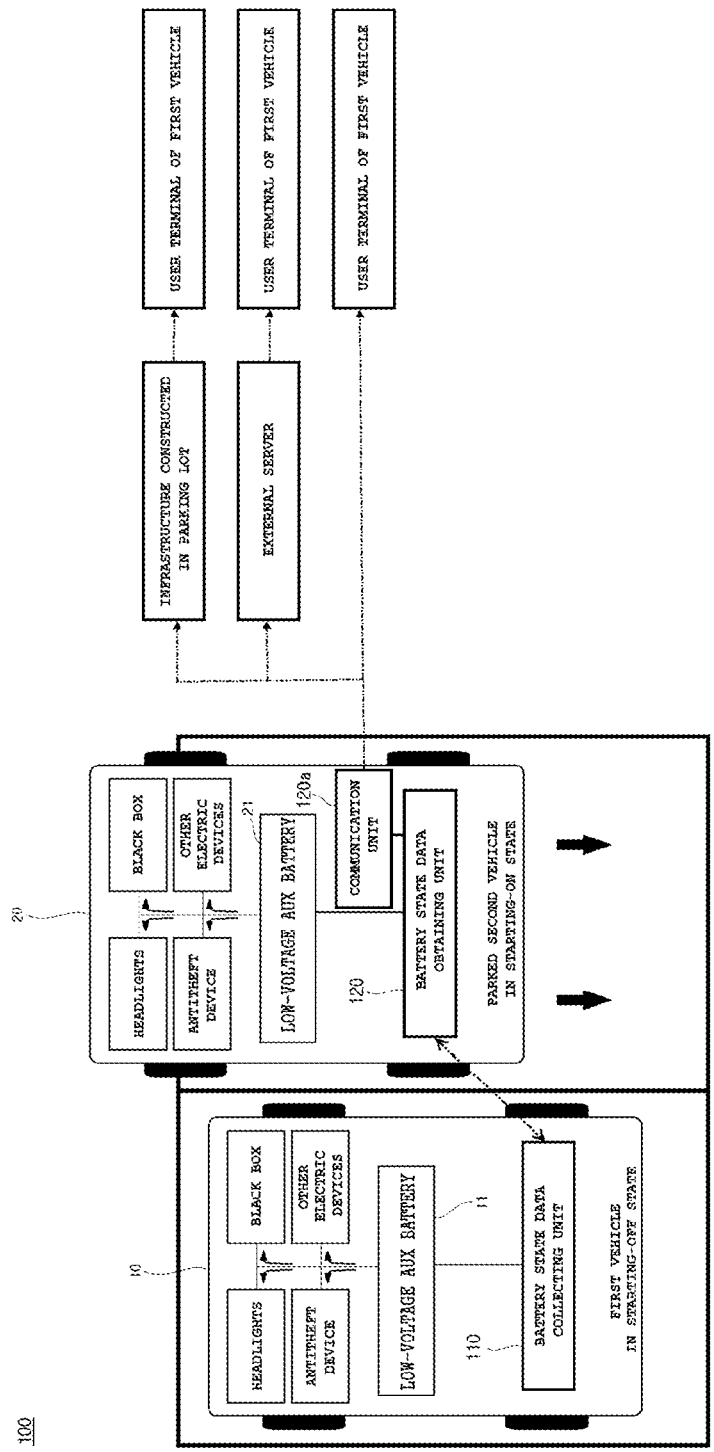
FIG. 2 is a diagram illustrating a state where battery state data is obtained from a first vehicle 10 and is provided through a system 100 for remotely managing a battery for a vehicle according to an exemplary embodiment of the present invention.
Figure 3:
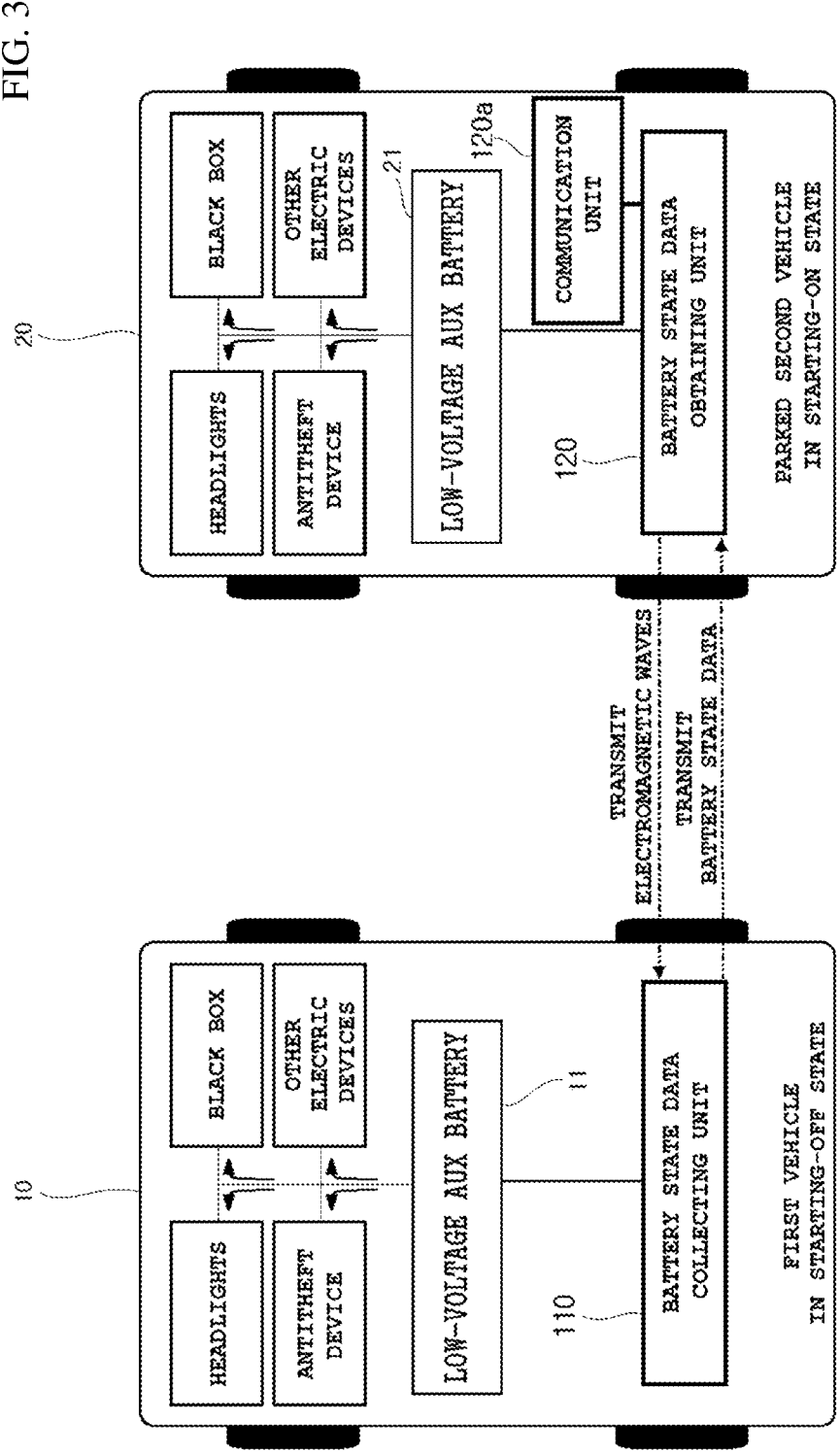
FIG. 3 is a diagram illustrating a process of transceiving electromagnetic waves and a process of transceiving battery state data between a battery state data collecting unit 110 and a battery state data obtaining unit 120, which are illustrated in FIG. 2.

FIG. 2 is a diagram illustrating a state where battery state data is obtained from a first vehicle 10 and is provided through the system 100 for remotely managing a battery for a vehicle according to an exemplary embodiment of the present invention, and FIG. 3 is a diagram illustrating a process of transceiving electromagnetic waves and a process of transceiving battery state data between a battery state data collecting unit 110 and a battery state data obtaining unit 120, which are illustrated in FIG. 2.

Referring to FIGS. 2 and 3, the system 100 for remotely managing a battery for a vehicle according to the exemplary embodiment of the present invention may generally include the battery state data collecting unit 110 and the battery state data obtaining unit 120.

First, the battery state data collecting unit 110 is provided in a vehicle for management, that is, the first vehicle 10, corresponding to a state in which a power supply is off, and is electrically connected with a low-voltage auxiliary battery 11 supplying power to various electronic devices of the first vehicle 10, thereby serving to collect battery state data of the first vehicle 10.

The battery state data collecting unit 110 is electrically connected with the low-voltage auxiliary battery 11, but the battery state data collecting unit 110 is not driven by receiving a voltage from the low-voltage auxiliary battery 11, but may receive electromagnetic waves emitted from a second vehicle 20 in which the battery state data obtaining unit 120 to be described below is provided, and then rectify the received electromagnetic waves to use the rectified electromagnetic waves as operation power. Accordingly, the battery state data collecting unit 110 does not influence a charging quantity of the low-voltage auxiliary battery 11 of the first vehicle 110.

The battery state data collecting unit 110 may include a passive radio frequency identification (RFID) tag module, and the battery state data obtaining unit 120 to be described below may include a passive RFID reader module.

Accordingly, in a power supply relation, the battery state data collecting unit 110 may serve as a receiver receiving electromagnetic waves through the passive RFID tag module, and the battery state data obtaining unit 120 to be described below may serve as a transmitter emitting electromagnetic waves.

In the meantime, in the relation of the provision of the battery state data, the battery state data collecting unit 110 may serve as a provider providing battery state data through the passive RFID tag module, and the battery state data obtaining unit 120 to be described below may serve as a receiver receiving battery state data, which will be described below.

Next, the battery state data obtaining unit 120 is electrically connected with a low-voltage auxiliary battery 21 of a vehicle corresponding to a state in which a power supply is on, that is, the second vehicle 20 which is positioned to be adjacent to the first vehicle 10, is being parked, and is in a starting state, so that the battery state data obtaining unit 120 is supplied with power from the low-voltage auxiliary battery 21 of the second vehicle 20 and is operated to be on, thereby serving to emit electromagnetic waves to the battery state data collecting unit 110 and serving to receive the collected battery state data.

The battery state data obtaining unit 120 may include a communication unit 120a which provides a separate external server 30 with the battery state data by using wired/wireless network communication so that the obtained battery state data is transmitted to a user terminal of the first vehicle 10.

The communication unit 120a provides an infrastructure (for example, a separate private server) constructed in a parking lot and the like with the battery state data obtained through the passive RFID reader module, so that the battery state data may also be transmitted to the user terminal of the first vehicle 10 through the infrastructure, and the communication unit 120a provides a separate external server, such as a server of an automobile company, with the battery state data obtained through the passive RFID reader module, so that the battery state data may be transmitted to the user terminal of the first vehicle 10 through the external server. In this case, it is noted that the infrastructure constructed in a parking lot and the like need to have information about each vehicle, owner information (user information), and the like in advance and convert the information into a database.

Further, in the exemplary embodiment, the communication unit 120a may also transmit the battery state data obtained through the passive RFID reader module to the user terminal of the first vehicle 10, and in this case, vehicle information and owner information (user information) of the first vehicle 10 are previously registered and stored in the battery state data obtaining unit 120, so that the battery state data may be automatically transmitted to the corresponding user terminal.

In the meantime, it is noted that the battery state data obtaining unit 120 is designed so as to simply serve to obtain the battery state data from the battery state data collecting unit 110 and then transmit the obtained battery state data to the external server or the user terminal, and to maintain security so as to prevent a user of the second vehicle 20 from directly obtaining or reading the vehicle information and the like about the first vehicle 10 through the battery state data obtaining unit 120.

Next, a process of remotely managing a state of a battery of a vehicle for management through the system 100 for remotely managing a battery for a vehicle will be sequentially described with reference to FIG. 4.

Figure 4:
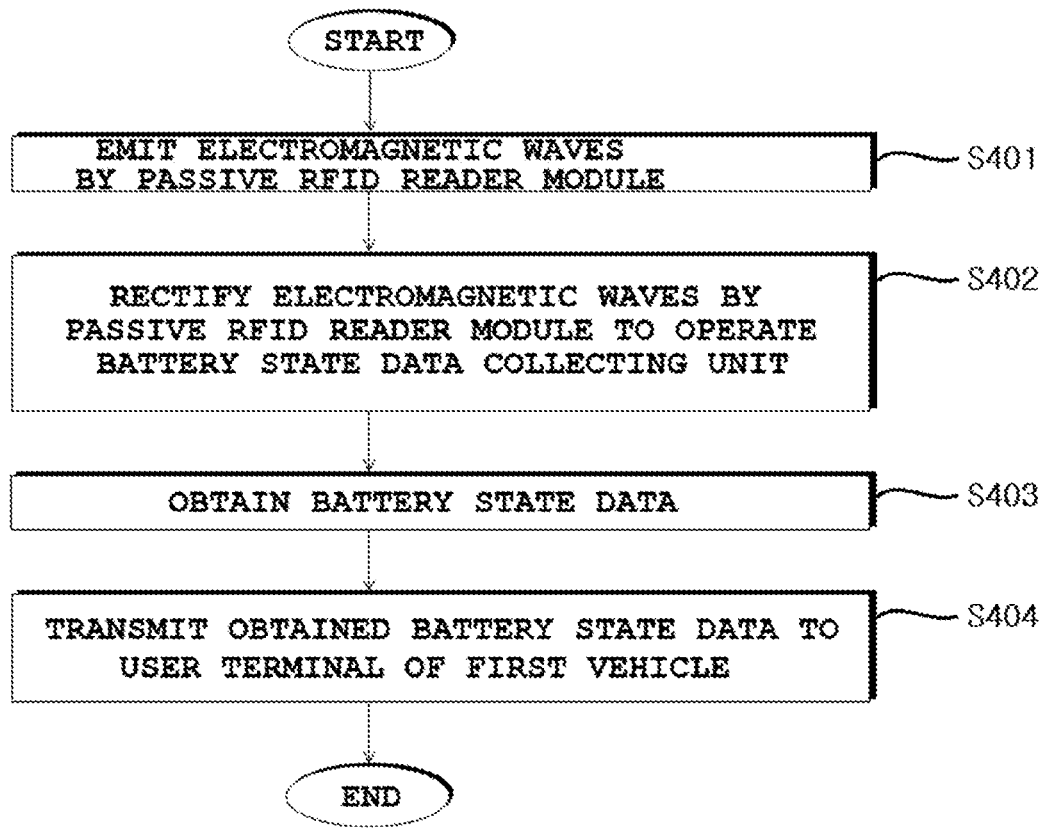
FIG. 4 is a diagram sequentially illustrating a series of processes of obtaining battery state data from a vehicle for management and providing a user terminal with the obtained battery state data through the system 100 for remotely managing a battery for a vehicle, which is illustrated in FIG. 2.

FIG. 4 is a diagram sequentially illustrating a series of processes of obtaining battery state data from a vehicle for management and providing a user terminal with the obtained battery state data through the system 100 for remotely managing a battery for a vehicle, which is illustrated in FIG. 2.

Referring to FIG. 4, first, the passive RFID reader module of the battery state data obtaining unit 120 emits electromagnetic waves according to the start-off of the first vehicle 10 (S401), and the passive RFID tag module of the battery state data collecting unit 110 receives and rectifies the electromagnetic waves and uses the rectified electromagnetic waves as operation power, so that an on-operation of the battery state data collecting unit 110 is initiated (S402).

Next, the passive RFID tag module of the battery state data collecting unit 110 collects battery state data from the low-voltage auxiliary battery 11 and then provides the passive RFID reader module with the collected battery state data, so that the battery state data obtaining unit 120 obtains the battery state data (S403).

Next, the communication unit 120a provides a public infrastructure constructed in a parking lot, provides an external server, or directly provides the previously registered user terminal of the first vehicle 10 with the obtained battery state data (S404), and thus the user of the first vehicle 10 may monitor a current state of a battery of his/her vehicle at a remote place in real time.

In the forgoing, the present invention has been described with reference to the exemplary embodiment of the present invention, but those skilled in the art may appreciate that the present invention may be variously corrected and changed within the range without departing from the spirit and the area of the present invention described in the appending claims.

The invention claimed is:

1. A system for remotely managing a battery for a vehicle, the system comprising:
   a battery state data collecting unit which is provided in a first vehicle corresponding to a power off state, and collects battery state data of the first vehicle; and
   a battery state data obtaining unit which is provided in a second vehicle, wherein the battery state data obtaining unit is configured to:
      when the second vehicle is in a power on state and positioned adjacent to the first vehicle, transmit electromagnetic waves to the battery state data collecting unit by using power of a battery of the second vehicle to turn on the battery state data collecting unit, and
      obtain the battery state data from the battery state data collecting unit, and
   provide the battery state data to an external server so that the obtained battery state data is capable of being provided through the external server to a user terminal for management of the first vehicle.

2. The system of claim 1, wherein the battery state data collecting unit includes a passive radio frequency identification (RFID) tag module, and the battery state data obtaining unit includes a passive RFID reader module.

3. The system of claim 2, wherein the battery state data collecting unit rectifies electromagnetic waves emitted from the passive RFID reader module to initiate an on-operation.

4. The system of claim 2, wherein the passive RFID tag module is electrically connected with an auxiliary battery of the first vehicle.

5. The system of claim 2, wherein the battery state data obtaining unit further includes a communication unit which is configured to provide the battery state data obtained through the passive RFID reader module to the external server by using wired/wireless network communication.

6. A method of remotely managing a battery for a vehicle, the method comprising:
   collecting, by a battery state data collecting unit provided in a first vehicle corresponding to a power off state, battery state data of the first vehicle;
   transmitting, by a battery state data obtaining unit provided in a second vehicle that is in a power on state and that is positioned adjacent to the first vehicle, electromagnetic waves to the battery state data collecting unit by using power of a battery of the second vehicle to turn on the battery state data collecting unit, and obtaining the battery state data from the battery state data collecting unit; and
   providing, by the battery state data obtaining unit, the obtained battery state data to an external server.

7. The method of claim 6, wherein the electromagnetic waves are transmitted to a passive radio frequency identification (RFID) tag module of the battery state data collecting unit, and wherein the battery state data is obtained from the battery state data collecting unit by a passive RFID reader module of the battery state data obtaining unit.

8. The method of claim 7, further comprising:
   rectifying, by the battery state data collecting unit electromagnetic waves emitted from the passive RFID reader module to initiate an on-operation.

9. The method of claim 7, wherein the passive RFID tag module is electrically connected with an auxiliary battery of the first vehicle, the method further comprising:
   collecting, by the passive RFID tag module, battery state data from the auxiliary battery.

10. The method of claim 7, further comprising:
    providing, by a communication unit of the battery state data obtaining unit, the battery state data obtained through the passive RFID reader module to the external server by using wired/wireless network communication.

* * * * *